United States Patent [19]

Esposito et al.

[11] Patent Number: 5,087,502

[45] Date of Patent: Feb. 11, 1992

[54] PROCESS AND INTERMEDIATE SHEET FOR FORMING SHAPED INTERLAYER BLANKS

[75] Inventors: Robert A. Esposito, Amherst; David P. Bourcier, Ludlow, both of Mass.

[73] Assignee: Monsanto Company, St. Louis, Mo.

[21] Appl. No.: 420,807

[22] Filed: Oct. 12, 1989

Related U.S. Application Data

[63] Continuation-in-part of Ser. No. 121,555, Nov. 17, 1987.

[51] Int. Cl.⁵ .................................................. B32B 3/00
[52] U.S. Cl. ..................................... 428/156; 428/192; 428/194; 428/195; 428/207; 428/213; 428/215; 428/210; 428/220; 428/437; 428/906; 264/177.1
[58] Field of Search ................. 428/156, 437, 906, 38, 428/172, 194, 192, 195, 203, 204, 207, 213, 215, 525, 210, 220, 332

[56] References Cited

U.S. PATENT DOCUMENTS

| | | | |
|---|---|---|---|
| 2,937,407 | 3/1960 | Richardson | 18/48 |
| 3,019,475 | 2/1962 | Smith | 18/1 |
| 3,696,186 | 10/1972 | Stark | 264/292 |
| 3,868,286 | 2/1975 | Fariss et al. | 428/437 |
| 3,885,899 | 5/1975 | Gurta et al. | 425/135 |
| 3,912,440 | 10/1975 | Koss et al. | 425/335 |
| 3,922,456 | 11/1975 | Baldridge | 428/437 |
| 4,302,263 | 11/1981 | Postupack | 156/100 |
| 4,316,868 | 2/1982 | Esposito et al. | 264/171 |

*Primary Examiner*—Ellis P. Robinson
*Assistant Examiner*—Donald J. Loney
*Attorney, Agent, or Firm*—Michael J. Murphy; William J. Farrington; Richard H. Shear

[57] ABSTRACT

A process for forming intermediate sheeting for forming shaped interlayer blanks comprising extruding plasticized polyvinyl butyral melt into an endless straight-sided sheet having a gradient color band extending along one side, the melt forming the region of the sheet laterally of the color band extruding at a greater thickness than that forming the portion containing the color band, thereby providing a wedge-shaped thickness profile in the sheet, quenching the extruded sheet to set the polymer and winding the sheet in roll form. The intermediate sheet is at least about twenty inches wide and the wedge-shaped cross section gradually increases from about 28 to 32 mils at one edge to about 33 to 40 mils at the other edge.

4 Claims, 2 Drawing Sheets

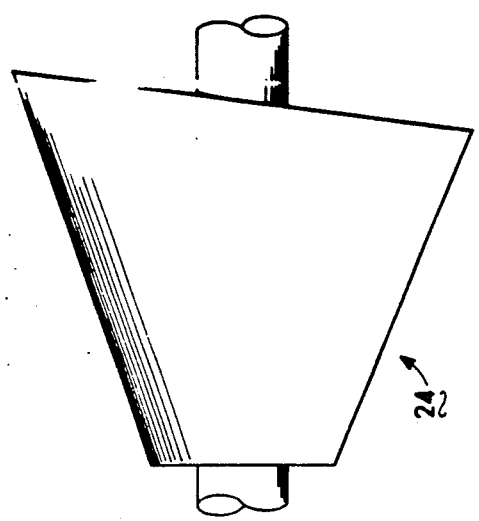
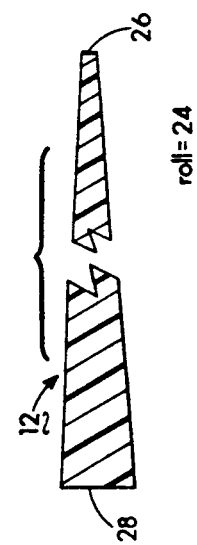
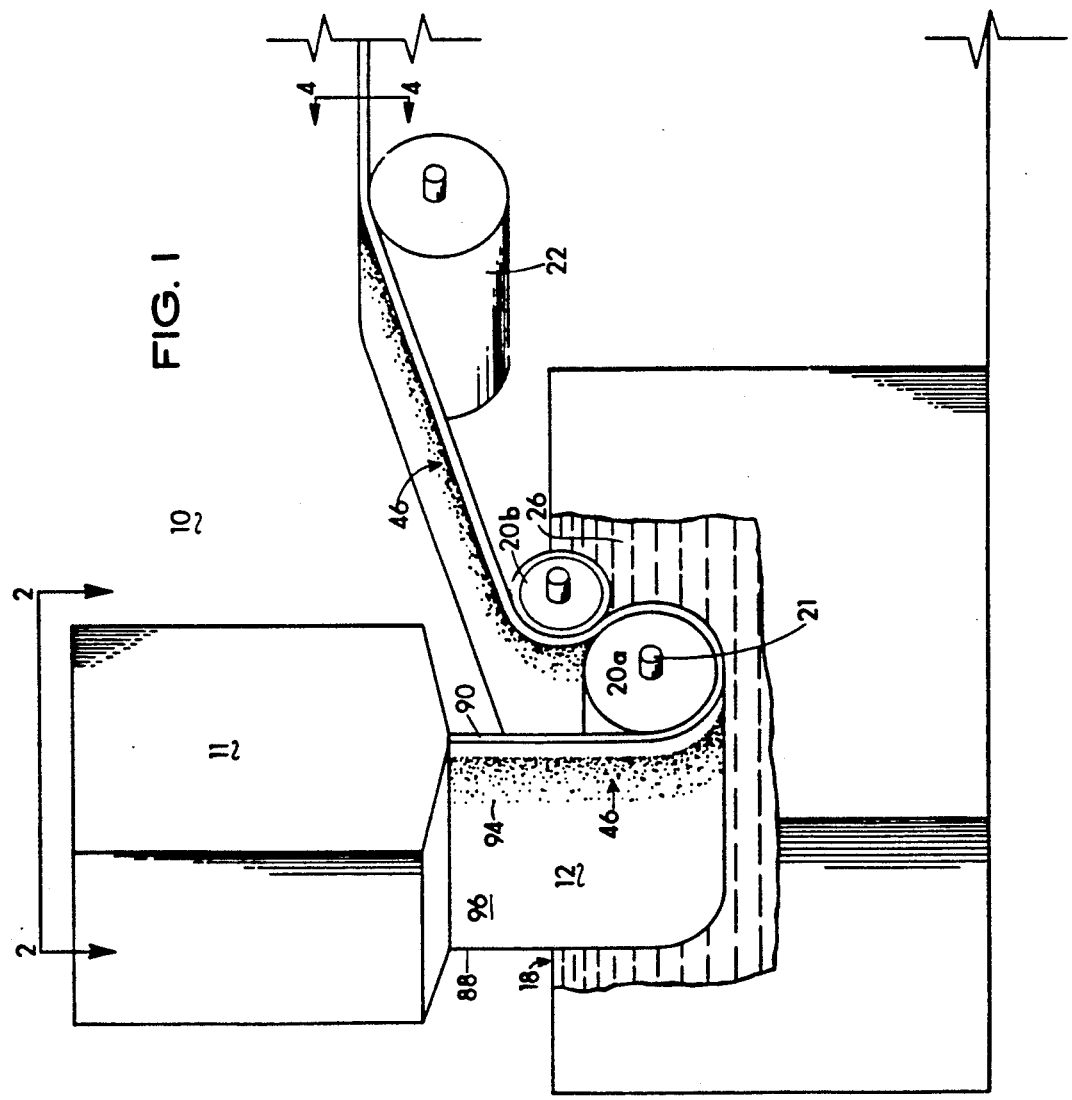

PROCESS AND INTERMEDIATE SHEET FOR FORMING SHAPED INTERLAYER BLANKS

CROSS REFERENCE TO RELATED APPLICATION

This application is a continuation-in-part of copending application Ser. No. 121,555, now pending, filed Nov. 17, 1987.

BACKGROUND OF THE INVENTION

This invention relates to forming thermoplastic interlayer sheeting and more particularly to sheeting and a method for its formation which is used to form discrete, shaped blanks suitable for laminated safety glass windshields.

Thin sheet usually formed of plasticized polyvinyl butyral is well known as an interlayer in laminated safety glass finding application in windows such as penetration-resistant automobile windshields. A very well known problem in view of many patents dealing with it since the first in the United States issued in 1952, is the performance deficiency in the interlayer when used in a specially curved and angled windshield. More specifically, sheet in such applications has traditionally been shaped in association with glass laminating downstream of sheet forming by stretching into a shape to match the desired windshield configuration. Special problems arise when the interlayer has a colored band along one margin which is intended to reduce glare from the sun when in place in the windshield. The band is usually graduated in color intensity with the greatest color along the upper peripheral portion of the windshield which then gradually diminishes to an almost imperceptible cutoff line at the lower edge of the band. When such gradient band windshield has horizontal and vertical curvature, as is usual with modern wrap-around automobile windshields, it has been necessary to stretch each sheet section to an accurate shape before associating it with the glass so that after lamination the cut-off line of the band is parallel to the upper edge of the windshield. This amount of initial stretching compensates for the initial lack of curvature of the color band which if unstretched would produce a cut-off line not parallel to the upper edge of a curved wrap-around windshield.

As well delineated in the prior art, for example col. 2, lines 3-28 of U.S. Pat. No. 4,244,997, uneven stretching of sheet after its formation adversely affects its subsequent performance in a windshield. More specifically, differential stretching of sheet of initial constant thickness inherently results in localized thickness reduction which translates to variable impact resistance in the windshield, such resistance being lower in the area of reduced thickness. It would be desirable to provide a system for forming interlayer windshield blanks reducing or eliminating such non-uniform thickness shortcomings of the prior art.

SUMMARY OF THE INVENTION

Now improvements have been made which diminish prior art shortcomings with respect to interlayer blanks for laminated safety glass windows.

Accordingly, it is a principal object of this invention to provide an improved method for forming thermoplastic interlayer blanks usable with glass in automotive windshields.

Another object is to provide intermediate sheeting having a special uneven thickness profile which is usable as a precursor for forming shaped interlayer blanks in known prior art sheet reheat systems.

A further object is to provide a cut blank for a windshield or a building window having improved thickness uniformity providing improved impact performance in a laminated glass assembly.

Other objects of this invention will in part be obvious and will in part appear from the following description and claims.

These and other objects are accomplished by providing a process for forming intermediate sheeting for forming shaped interlayer blanks comprising the steps of extruding plasticized polyvinyl butyral melt into an endless sheet having substantially parallel edges and an integral gradient color band extending along one side graduated in color intensity from relatively deep adjacent one edge of the sheet fading to extinction at a cutoff line laterally of such one edge, the melt forming one region of the sheet extruding at a greater thickness than the thickness of the melt forming the remainder of the sheet thereby providing a wedge-shaped thickness profile in the sheet; quenching the sheet to set the polymer and winding the sheet in roll form.

Also provided is intermediate plasticized polyvinyl butyral sheet for forming vehicle window blanks, such sheet being at least about twenty inches wide having substantially parallel longitudinally extending edges and a wedge-shaped thickness profile, preferably from about 28 to 32 mils to about 33 to 40 mils across the width of the sheet. The graduated color strip is preferably adjacent the edge of lesser thickness.

BRIEF DESCRIPTION OF THE DRAWINGS

In describing the overall invention, reference will be made to the accompanying drawings wherein:

FIG. 1 is a schematic, elevational view of a system embodying the process of the invention;

FIG. 4 is a partial sectional view along 4—4 of FIG. 1 showing the sheet thickness profile; and FIG. 5 is an accumulation of the sheet of FIG. 4 in roll form.

DETAILED DESCRIPTION OF THE INVENTION

Figure 2:
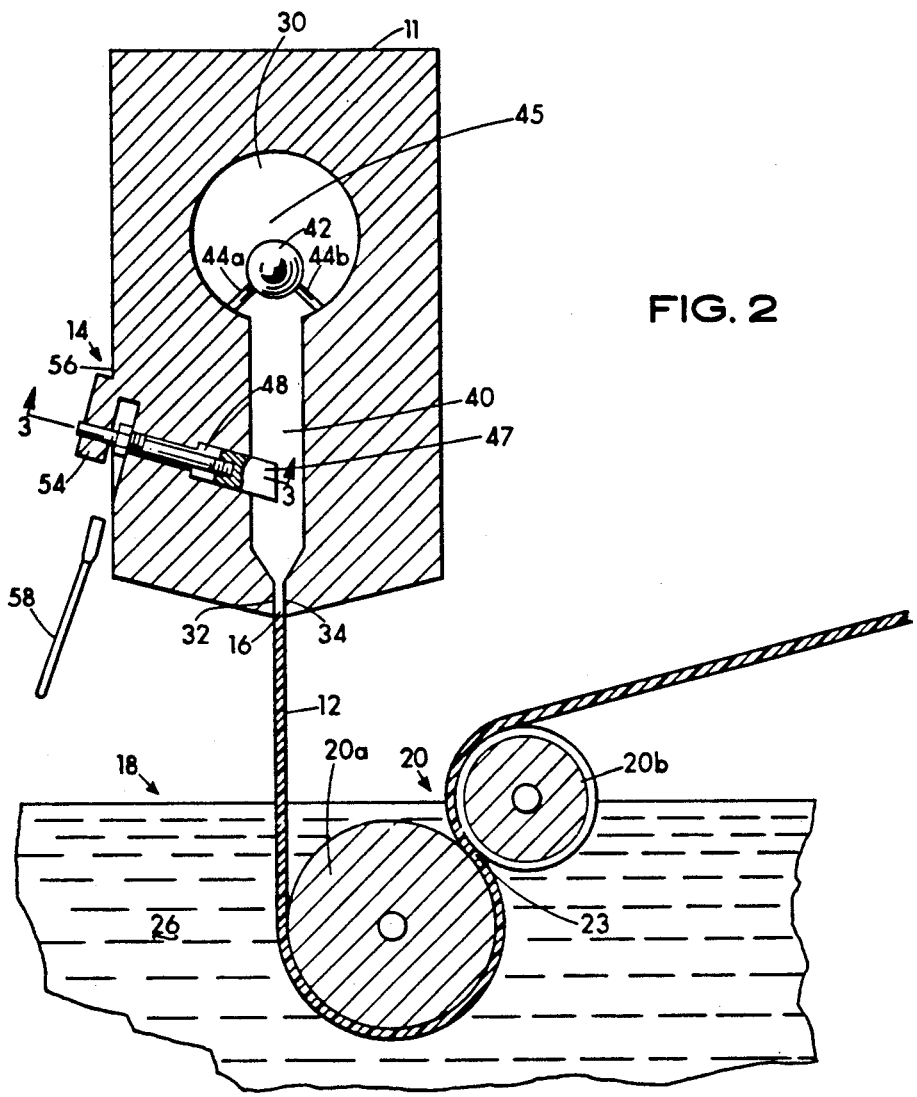
FIG. 2 is a central vertical sectional view in direction 2—2 of FIG. 1.
Figure 3:
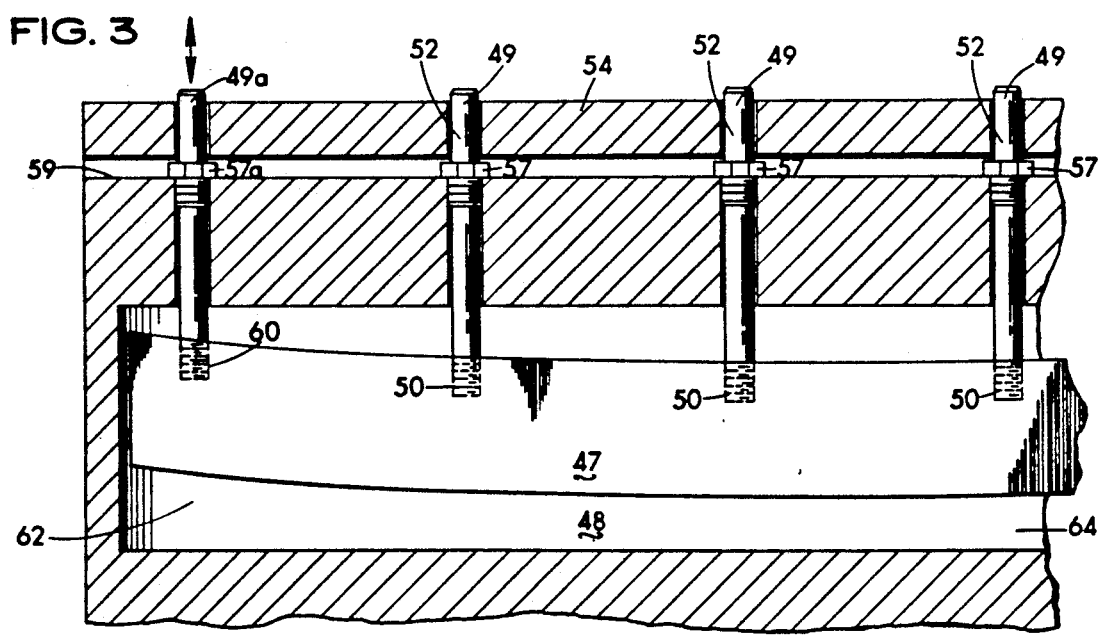
FIG. 3 is a sectional view along 3—3 of FIG. 2.

Referring now to the drawings, apparatus, collectively identified as 10, is shown in FIGS. 1-3 for forming intermediate sheeting used as a precursor to form discrete, shaped interlayer blanks using known reheat sheet-shaping apparatus, not shown. Apparatus 10 comprises extrusion shaping die 11 having slot 16 (FIG. 2) at its outlet for forming intermediate sheet 12 from thermoplastic melt, means 14 (FIGS. 2, 3) associated with die 11 for causing a portion of the melt forming sheet 12 to exit slot 16 at a greater mass flow rate than remaining melt portions simultaneously exiting slot 16 and means 18 (FIGS. 1 and 2) adjacent die 11 for quenching sheet 12 immediately after forming which includes cylindrical pull rolls 20 (FIG. 2).

Means 18 for quenching sheet 12 comprises a cooling medium 26, which may be water, within tank 28 below die 11 in which vertically lowermost cylindrical pull roll 20a is at least semi-immersed. In place of or in addition to tank 28 and medium 26, a coolant conventionally controlled at a desired temperature could be circulated continuously through one or both of rolls 20. In the illustrated embodiment, roll 20a has a conventional uncovered metal surface but, if desired, it may be covered with an appropriate material such as rubber or otherwise treated to promote frictional engagement with sheet 12. Roll 20a is rotatably mounted for turning movement by a conventional drive means not shown, operatively associated with drive shaft 21. Roll 20a peripherally engages cooperating, upper cylindrical idler roll 20b which is faced with rubber, both such rolls defining nip 23 therebetween though which passes sheet 12 as will be described.

Die 11 (FIG. 2) is on the discharge end of a conventional extrusion system, not shown, comprising one or two screws turning within a casing for advancing flowable thermoplastic melt through cylindrical manifold 30 toward and through slot 16. Substantially parallel lips 32, 34 preferably each have a smooth land surface and together delimit and define slot 16. Approach passage 40 intercommunicates at one end with manifold 30 and converges at its forward end to slot 16.

Die 11 preferably includes a generally torpedo-shaped probe 42 (FIG. 2) within and affixed via supports 44a and 44b to the walls of manifold 30. Probe 42 is eccentrically offset just forward of manifold axis 45 toward approach passage 40 and has its long axis parallel to slot 16. Probe 42 contains an extrusion slot, not shown, parallel with its long axis for incorporating, upstream of slot 16, a colored stream of melt into the main melt stream forming sheet 12, to provide gradient color band 46 (FIG. 1) in and extending along one side of sheet 12. Further details of probe 42 are described in U.S. Pat. No. 4,316,868, col. 2, line 60 through col. 6 line 7, the content of which is incorporated herein by reference.

Means 14 (FIGS. 2, 3) associated with die 11 for causing during extrusion a portion of the melt to exit slot 16 at a greater mass flow rate than remaining portions of the melt, comprises metal choke bar 47 slidably mounted within a slot 48 which extends crosswise across the full width of and parallel to slot 16 of die 11. Plural threaded positioning rods 49 are telescopically slidable in bores in die 11. Each rod 49 has a lower end 50 threadably secured to bar 47 and an upper end 52 within a coaxial bore extension in bracket 54 fixed to side surface 56 of die 11. Each rod 49 has an exposed threaded section along its length. Exposed threaded nuts 57 are manually rotatable using wrench 58 along an associated threaded portion of each rod 49. When desired to locally change (for example to increase) the cross sectional opening in passage 40 beneath bar 47 relative to that of adjacent section(s) of such passage, one or more nuts 57 (such as 57a in FIG. 3) bearing against surface 59 of die 11 is turned to forcibly draw rod 49a outwardly, which, since rod 49a is secured at 60 to choke bar 47, causes bar 47 to bend outwardly within slot 48 to form passage region 62 locally increased in cross sectional size relative to adjacent region 64. The locally increased passage size may optionally be developed (or that provided by choke bar 47 as just described may be augmented) forwardly of choke bar 47 in the direction of extrusion by bending a predetermined lateral zone of one or both slot-defining lips 32, 34 outwardly relative to adjacent lip sections in generally the same manner as described for choke bar 47. This may be accomplished by manually forcibly deflecting such lip zone about a hinged area of decreased thickness with an adjustable die lip control system, not shown. Movement of these members (i.e. bar 47 and local portions of the lips) in the manner described is on the order of a few thousandths of an inch.

A conventional rotating winder assembly (not shown) synchronously linked with the drive means turning pull roll 20a is downstream of intermediate cylindrical support roll 22 for maintaining tension in the sheet and winding it on itself to form roll 24 (FIG. 5) of intermediate sheeting intended for reshaping into interlayer blanks in a manner to be further described.

The process for forming intermediate sheeting 12 using apparatus 10 comprises sequential steps the first of which includes extruding plasticized polyvinyl butyral melt from die 11 by forcing such melt through slot 16 where it is shaped into endless sheet 12 having substantially parallel edges 88, 90. On exiting slot 16 the polymer of sheet 12 is at elevated temperature as a result of energy input in the upstream extrusion system which melts and causes the polymer to flow. Sheet 12 preferably contains integral gradient color band 46 adjacent one edge 90 which is graduated in color intensity from relatively deep adjacent edge 90 fading to extinction at laterally inward cut off line 94. Color band 46 is formed by feeding a colored secondary flow of molten plasticized polyvinyl butyral polymer to and through an extrusion slot in probe 42 at substantially the same temperature and viscosity as that of the main flow of clear molten polymer in manifold 30 of extrusion die 11. Both the main flow and colored secondary flow are simultaneously extruded at different velocities toward the outlet slot 16 such that a layer of colored melt is completely encapsulated in the main flow of polymer. Further details of such encapsulation and extrusion are disclosed in U.S. Pat. No. 4,316,868 which as indicated is in part incorporated herein by reference.

Conventional techniques known in the art can be employed in association with the extrusion process to produce a rough surface on one or both sides of the extruding sheet. These involve the specification and control of one or more of the following: polymer molecular weight distribution, water content of the melt, melt and die exit temperature, die exit geometry etc. Systems describing such techniques are disclosed in U.S. Pat. No(s). 2,904,844; 2,909,810; 3,994,654; 4,575,540 and published European Application No. 0185,863.

Because of the increased mass flow rate of melt occurring as a result of the increased cross section of region 62 of passage 40 provided via the preset positioning of choke bar 47 as previously described, integrally formed zone 96 of single layer sheet 12 is locally increased in thickness relative to the laterally adjacent portion containing color band 46. Thus, melt forming zone 96 of sheet 12 to be later stretched the most in shaping interlayer blanks therefrom in a manner to be described, has an initial thickness after extrusion on issuing from the die opening which is greater than that containing color band 46 along the opposite side of the sheet.

After issuing downwardly from the opening at the forward end of slot 16, the pendant sheet having a purposely uneven predetermined thickness profile is drawn into engagement with the periphery of rotating pull roll 20a which is driving roll 20b at the same rotative speed. Alternatively, roll 20b could be separately driven at a slightly different speed than 20a. Since roll 20a is set in cooling bath 26, sheet 12 is quenched and reduced in temperature to at least partially set the polymer and promote retention of roughened surfaces previously formed during extrusion before passing around roll 20a. As the sheet passes through the nip defined by rotating rolls 20, the rubber facing of roll 20b deforms to accommodate the wedge-shaped thickness profile of the sheet. Alternatively, roll 20b could be tilted slightly from a parallel position with roll 20a to accommodate such uneven sheet thickness.

Upon emerging from bath 26, the shape-stable sheet is accumulated by winding on a cylindrical or conical core using known, commercially available winding equipment in-line with the just described sheet-forming equipment, thereby successively forming rolls typically illustrated, using a cylindrical core, as 24 in FIG. 5. When a conical core is used, its taper substantially matches the wedge-shaped outline of the sheet thickness illustrated in FIG. 4.

In conjunction with forming rolls 24, means, known in the art, can be introduced into a roll 24 prior to engaging successive plies to minimize sticking of plies to each other before roll use. Typical of such means are polyethylene interleaving film and sodium bicarbonate powder. Alternatively, rolls 24 can be formed without such means and sticking minimized by refrigerating the rolls at a temperature on the order of about 32° F. (0° C.) until ready for use.

Roll 24 comprises the preferred form of intermediate plasticized polyvinyl butyral sheet precursor for use in forming shaped vehicle window, e.g. front windshield, blanks, in reheat/stretch systems heretofore used in the art with conventional sheeting of substantially uniform initial thickness. Such intermediate sheet (12 in FIG. 4) has substantially parallel longitudinal edges, preferably has transversely graduated color strip 46 adjacent one edge (90 in FIG. 1) and is at least about 20 in (50.8 cm) preferably about 24 to 55 in (61 to 140 cm) wide in lateral dimension perpendicular to the wind/unwind direction. The sheet has a wedge-shaped thickness profile as in FIG. 4 which preferably gradually continuously increases across the width from 28 to 32 mils (0.51 to 0.64 mm) at edge 26 adjacent color strip 46 to about 33 to 40 mils (0.76 to 1.02 mm) at edge 28. Such profile and sheet width dimensions accommodate present commercial wrap-around windshields. These values can vary outside the stated ranges as future automotive designs develop but nevertheless are considered within the scope of the invention.

Rolls 24 of intermediate sheet 12 supply sheet reheating and shaping systems known in the prior art and typically shown in U.S. Pat. No(s). 2,593,504; 2,817,117; 2,937,407; 3,019,475; 3,038,208; 3,696,186; 3,885,899 and 4,267,140, the content of each of which is incorporated herein by reference. In such systems, finite lengths of intermediate sheet 12 are formed into discrete shaped blanks suitable for use directly in laminated safety glass windshields. More specifically the edges of heated deformable sections of sheet 12 are stretched to curved, arcuate configurations of different lengths, the edge adjacent gradient band 46, which will be at the top of the windshield when in the vehicle, being of smaller arc length after stretching than the other edge which will be at the bottom of the windshield. Importantly, use of the specially designed intermediate sheet in such prior art systems produces shaped blanks of more uniform thickness than those formed from conventional, unmodified PVB of substantially uniform thickness. This improvement is achieved by introducing the intermediate sheet to a prior art reheat-stretch system so the greater thickness profile region transverse to that containing the gradient band is stretched to a greater extent than the side with the gradient band. For example, when using a system such as disclosed in U.S. Pat. No. 3,885,899 where stretching occurs by engaging the pliable sheet with the conical surface of a truncated pull roll, the zone of the sheet of greater thickness encompassing edge 38, would engage the enlarged diameter end of the cone. Such enlarged diameter end turning at a greater surface speed that the other smaller diameter end stretches and thins the initially locally thick zone to a greater extent than the portion of the sheet containing gradient color band 46 in contact with the smaller end of the cone. This stretching pattern reduces the thickness of the initially thick region to that of the rest of the sheet. This results in a substantially uniform thickness after passage over the conical roll wherein the sheet possesses a different radius along each edge, that of greater radius being along the side formed from the greater thickness side of the specially profiled supply sheet.

Instead of the preferred roll form of intermediate sheet of the invention, blanks, either straight-sided or arcuately shaped, may be cut out of such sheet and used to supply such prior art reheat-stretch systems referred to above. Some modifications would be required, however, since such systems are designed to handle only rolled sheet. A system for cutting such blanks is described in and disclosed at 22 in FIGS. 1 and 2 of U.S. Pat. No. 4,808,357.

Alternatively to the apparatus arrangement just described, a prior art reheating and reshaping system such as disclosed in the above-noted U.S. patents can be installed in-line with apparatus 10. With such an arrangement, sheet roll formation is eliminated as would be the sheet reheating means; the temperature of the wedge-shaped sheet would be adjusted to be appropriately deformable to form the desired blank of improved thickness uniformity by controlling the temperature of cooling medium 26.

Alternatively to the fixed die lip sheet extrusion and associated choke bar system shown in the drawings, a die roll system can be used to form the wedge-shaped sheet of the invention. With such a system, one of the lips defining slot 16 is replaced with a rotating cylinder having a preset surface temperature onto which is deposited the hot plastic forming the sheet. The wedge-shaped thickness profile would be achieved in such an alternate system utilizing a choke bar as previously described.

The following working example is for illustration only and should not be taken in a limited sense.

EXAMPLE

Polyvinyl butyral polymer commercially available from Monsanto Company as Butvar ® resin was mixed with dihexyl adipate plasticizer (32.5 phr) in a high intensity batch mixer and charged continuously to a vented worm extruder (32/1 L/D). Melt at about 400° F. (204° C.) and 3,000–5,000 psi (20.67–34.45 MPa) at the extruder outlet was end fed at 276 lbs (125 kg) per hr to a sheeting die of the type shown in FIG. 2, i.e. polymer at 635 psi (4.38 MPa) entered cylindrical manifold 30 in a direction parallel to axis 45. A 28 in (71 cm) wide sheet having a surface roughness of $45\text{--}65 \times 10^{-5}$ in ($114\text{--}165 \times 10^{-5}$ cm) on each side issued vertically downwardly from the die, such roughness measured after the sheet had passed through the cooling bath and the nip between rolls 20. Integrally formed in the sheet was an 8.25 in (20.96 cm) wide colored gradient band measured in a direction perpendicular to that of extrusion. To determine the difference in mass flow rate across the die outlet slot, the extruding sheet was temporarily manually pulled from the outlet and immediately introduced into a 55° F. (12.8° C.) subjacent water bath and samples across the width of the sheet taken for thickness measurement. As a result of the choke bar setting upstream of the die lips and the associated manual adjustment of the position of portions of the die lips, the mass flow rate of melt was greater on the side of the sheet opposite that containing the gradient band. This was evident in a gradual progressive increase in thickness across the full width of the sheet starting from the side of least thickness adjacent the outer limit of the color band. The instantaneous average thickness of the sheet across its full width measured off-line in samples collected at a particular time during the run was 35.3±9 mils (0.09±0.02 cm), with the thickness along the side containing the gradient band being about 26 mils (0.07 cm) and that adjacent the opposite clear side being about 43 mils (0.11 cm). Such sheet is representative of the specially profiled intermediate sheet of the invention.

The method of the invention is capable of providing sheet used in reheat-stretching systems to form a cut blank shaped in general conformance with the shape of a windshield of complex curvature and which has high quality performance characteristics insofar as not significantly varying in thickness across its width.

The preceding description is set forth for purposes of illustration only and is not to be taken in a limited sense. Various modifications and alterations will be readily suggested to persons skilled in the art. It is intended therefore that the foregoing be considered as exemplary only and that the scope of the invention be ascertained from the scope of the following claims.

We claim:

1. Clear, intermediate plasticized polyvinyl butyral sheet for forming vehicle window blanks, said sheet being a single layer at least about twenty inches wide having substantially parallel longitudinally extending edges, a wedge-shaped thickness profile extending continuously across the width from edge to edge and a transversely graduated color strip adjacent one edge.

2. The sheet of claim 1 wherein the wedge-shaped thickness increases from about 28 to 32 mils to about 33 to 44 mils across the width of the sheet.

3. The sheet of claim 2 wherein the color strip is adjacent the edge of lesser thickness.

4. The sheet of claim 3 in roll form.

* * * * *